Oct. 23, 1962  R. W. JENSEN  3,059,897
BUTTERFLY VALVE
Filed Sept. 14, 1960

*INVENTOR.*
RAYMOND W. JENSEN
BY Hazard & Miller
ATTORNEYS

United States Patent Office 3,059,897
Patented Oct. 23, 1962

3,059,897
BUTTERFLY VALVE
Raymond W. Jensen, 7272 W. 91st St.,
Los Angeles 45, Calif.
Filed Sept. 14, 1960, Ser. No. 56,048
2 Claims. (Cl. 251—306)

This invention relates to a valve and more particularly to a butterfly type valve adapted to shut off flow through a conduit.

It is the general object of the invention to provide a valve having an annular seat within a housing wherein the valve element per se is in contact with the seat entirely thereabout in the closed position of the valve and wherein the shaft supporting the valve element is rotatably carried by the housing and placed at an angle to the plane of the annular seat so that it will not break up the continuity of the surface of the seat.

Another object of the invention is to provide a valve wherein the sealing ring will give slightly radially to compensate for possible departure of the seat from a true circle and wherein the valve seals in both directions with equal efficiency.

Another object of the invention is to provide a valve of the type mentioned above which is so constructed that it will function to efficiently cut off flow in the closed position without requiring costly extremely small tolerances in the formation of the seat and the seal on the valve element.

A further object of the invention is to provide a valve of the type described above which can be readily assembled and disassembled.

The above and other objects and advantages of the invention may more fully appear from the following description in connection with the accompanying drawing.

Figure 1:
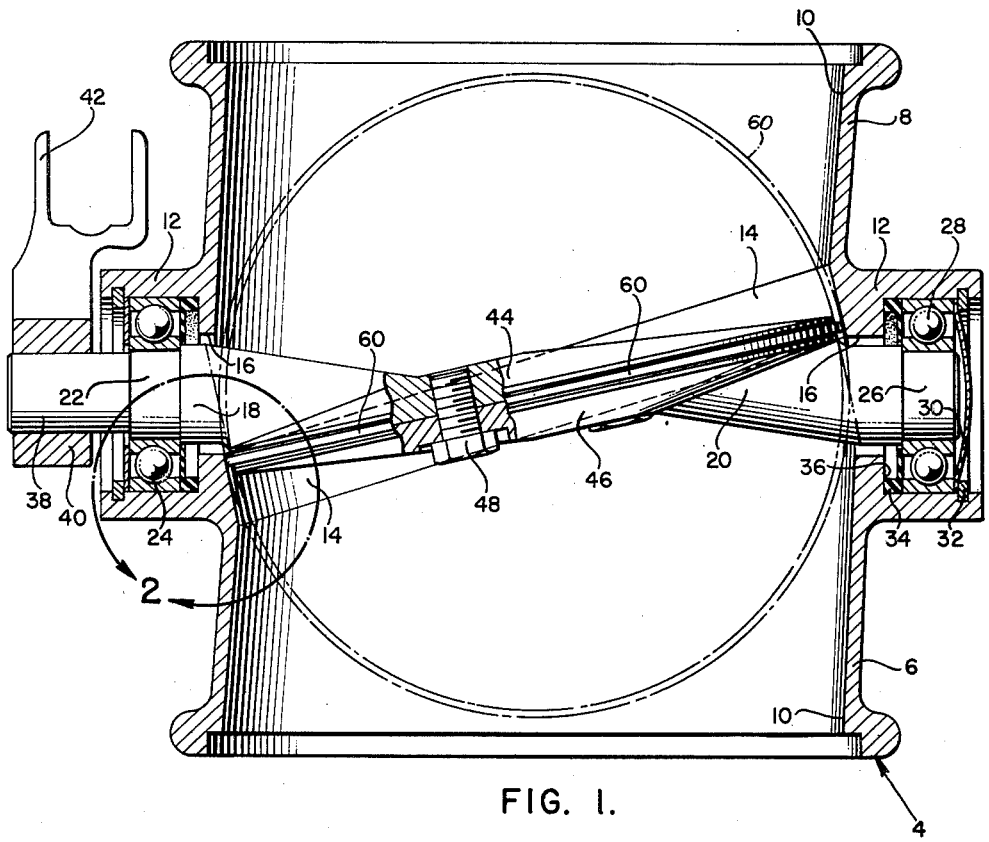
FIG. 1 is a longitudinal sectional view through an embodiment of the invention with a portion of the valve element broken away and in section.

In FIG. 1 there is shown a housing 4 having end portions 6 and 8 and a bore 10 therethrough. Intermediate the ends and axially aligned at opposite sides of the housing are bosses 12.

Within the bore 10 between the ends thereof is an annular valve seat 14 whose principal plane is shown lying at an angle to the longitudinal axis of the housing 4 and the bore 10. The seat 14 presents an unbroken internal annular surface which, at opposite points, lies at opposite sides of bores 16 through the bosses 12.

Located one each in the boss bores 16 are valve shaft sections 18 and 20. The section 18 has a reduced annular portion 22 supported in a ball bearing assembly 24, and shaft section 20 has a smaller portion 26 supported by ball bearing assembly 28. The shaft section 20 terminates inside of a sealing cap 30 held by removable locking ring 32 which is carried by a suitable channel in the right hand boss 12. A rubber or plastic seal 34 lies between a shoulder 36 in the right hand bore 16 and the inner side of the ball bearing assembly 28.

The shaft section 18 is provided with a smaller sealing arrangement with the difference that said shaft 18 has a reduced extension 38 which extends through an end plate 40 and has a valve operating lever 42 mounted thereon to rotate the valve shaft.

Within the main bore 10 each shaft section 18 and 20 carries a complementary valve element section 44 and 46. These elements are preferably circular in shape and are interconnected by suitable studs 48.

Figure 2:
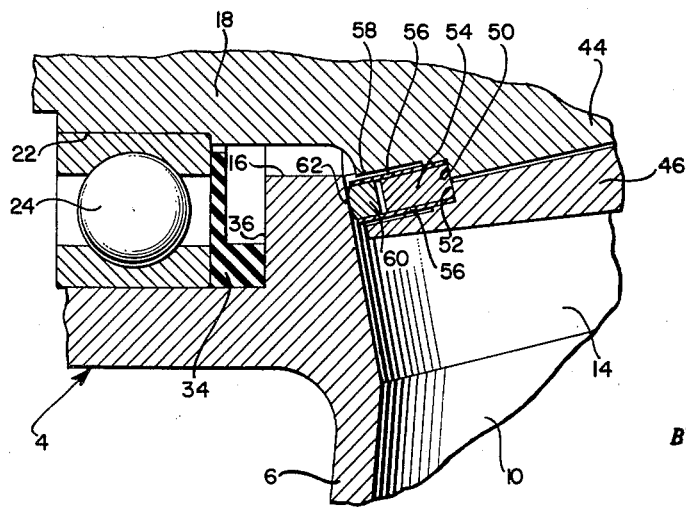
FIG. 2 is an enlarged sectional detail taken approximately on the line 2 of FIG. 1.

Referring to FIG. 2, the sections 44 and 46 of the valve element are provided with complementary circular rabbets 50 and 52 which receive a back-up ring 54 at opposite sides of which are sealing ring guides 56. The rabbets 50 are widened at 58 so that there is a space provided at the outer side of each of the sealing ring guides 56. A continuous annular sealing ring 60 is carried between the guides 56 and extends slightly radially outwardly from the guides. Its projecting periphery is slightly rounded as at 62 to provide a surface for engaging the annular valve seat 14 in sealing relation thereto. As shown in FIG. 2 there is a space provided between the sealing ring 60 and the back-up ring 54 which permits said sealing ring to deform radially inwardly at one or more points about the sealing ring. This permits the sealing ring to deform slightly to adapt to the exact shape of the annular internal valve seat 14. Consequently, while it is desirable to form the valve seat as nearly circular as practical, it can be slight out of round and proper sealing will still be provided.

If desired, the housing 4 can be made in two sections but it can be made in one piece as shown and a suitable seat forming tool can be inserted to smoothly finish the surface of the seat. When the housing is made in one piece, the valve shaft is made up of the sections 18 and 20 so that one valve section and its integral valve element section 44 or 46 can be placed in position independently of the other shaft section and its integral valve section, and the two valve sections connected by the bolts 48 after the structure is in position. It should also be noted that if replacement of a sealing ring 60 is required, it is necessary to remove only one of the valve sections 44 or 46 and its attached shaft section.

From the foregoing it will be seen that I have provided a butterfly type valve which includes an uninterrupted annular internal seat and an inner valve member wherein the sealing ring on the valve member will completely seal about 360° and wherein any slight variances in the seat from a true circle are compensated for by the deformable sealing ring.

It should be noted that my sealing ring construction with its rounded outer surface 62 and with the guides 56 spaced from the opposing side walls of the rabbets 58, the valve, when closed, will form an equally effective seal in either direction of flow through the bore 10 of the housing 4.

It will of course be understood that various changes can be made in the form, details, arrangement and proportions of the various parts without departing from the spirit of the invention.

I claim:

1. A valve comprising a housing having a bore, a portion of the bore having an internal annular seat therein, a pair of diametrically opposed shafts rotatably supported by said housing and having their longitudinal axes on a line extending through the opening defined by the annular seat at an angle to the plane of said seat, a pair of circular valve elements each carried by one of said shafts within said annular seat, means separably connecting said valve elements, each of said valve elements having a circular rabbet about the peripheries of their opposing faces defining an annular groove therebetween, said groove being narrower at its inner portion than at its outer portion, a pair of ring guides in said groove and coextensive with the depth of said groove, a back-up ring in said groove and clamped between said ring guides by said separably connected valve elements, a sealing ring outwardly concentric to said back-up ring and radially spaced therefrom, said sealing ring lying in the outer, wider portion of said groove, said guide rings having their radially outer portions abutting the sides of said sealing ring and said outer portions of said guide rings being spaced from the sides of said groove, said valve elements being movable conjointly by one of said shafts from a closed position with said sealing ring in contact with said seat entirely about the circumference of said valve elements to an open position with the plane of said valve elements and seat at angles to each other.

2. A valve as set forth in claim 1 wherein said sealing ring and said back-up ring are continuous and said sealing ring is radially deformable.

References Cited in the file of this patent

UNITED STATES PATENTS

| | | |
|---|---|---|
| 1,671,069 | De Wein | May 22, 1928 |
| 1,858,587 | Grant | May 17, 1932 |
| 2,703,586 | Asker | Mar. 8, 1955 |
| 2,840,338 | Shaw | June 24, 1958 |
| 2,934,312 | Stevens | Apr. 26, 1960 |

FOREIGN PATENTS

| | | |
|---|---|---|
| 843,845 | Great Britain | Aug. 10, 1960 |
| 966,554 | Germany | Aug. 22, 1957 |
| 1,154,823 | France | 1958 |